UNITED STATES PATENT OFFICE.

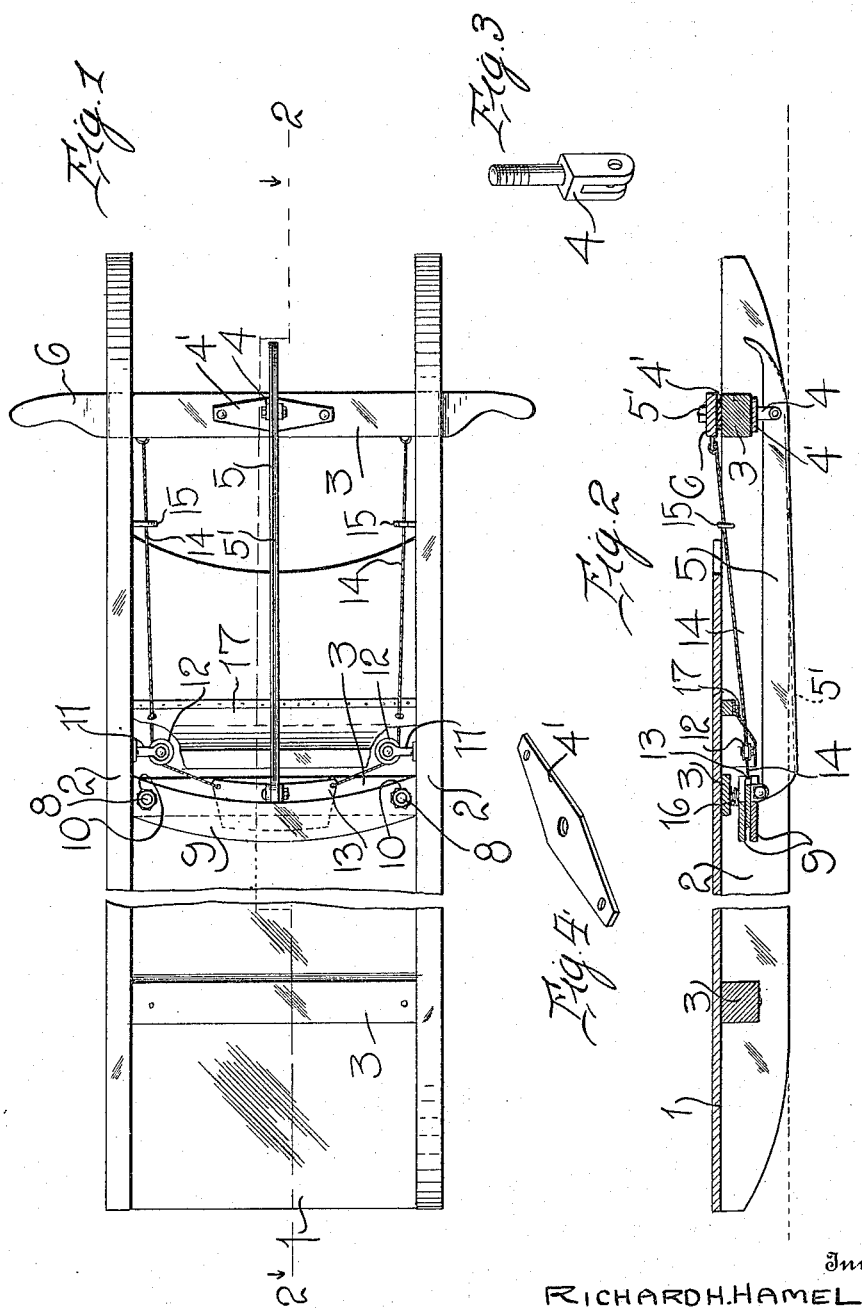

RICHARD H. HAMEL, OF FALL RIVER, MASSACHUSETTS.

SLED.

1,156,527.

Specification of Letters Patent.

Patented Oct. 12, 1915.

Application filed October 17, 1914. Serial No. 867,185.

*To all whom it may concern:*

Be it known that I, RICHARD H. HAMEL, a citizen of Canada, residing at Fall River, in the county of Bristol and State of Massachusetts, have invented certain new and useful Improvements in Sleds, of which the following is a specification, reference being had to the accompanying drawings.

This invention relates to improvements in sleds, and particularly to that class of sleds which are dirigible.

An object of this invention is the provision of a sled which includes a frame having a pair of spaced parallel runners rigidly connected thereto, and a steering blade or runner connected to the frame between the rigid runners, the lower edge of the steering runner projecting slightly below the rigid runners so that upon movement of the steering runner the sled will be turned in any desired direction.

A further object of this invention is the provision of a sled of this character in which manually operated means are provided for turning the steering runner with relation to the rigid runners, to guide the sled in any direction.

With these and other objects in view, my invention consists in the novel construction, combination and arrangement of parts, to be hereinafter more fully described, claimed, and illustrated in the accompanying drawing, in which—

Figure 1 is a bottom plan view of my improved sled; Fig. 2 is a sectional view on the line 2—2 of Fig. 1; Fig. 3 is a perspective view of the bolt for connecting the forward end of the steering runner to the sled; and Fig. 4 is a perspective view of one of the plates which are secured to the upper and lower faces of the forward cross bar through which the bolt carrying the steering bar extends.

Referring more particularly to the drawing, the numeral 1 designates the platform or body of the sled, the opposite edges of which are connected to spaced longitudinally extending runners 2, the forward ends of the runners projecting forwardly of the platform. The runners 2 are braced at intervals along their length by cross bars 3, one of the cross bars being disposed forwardly of the platform and being arranged with its upper face flush with the upper edges of the runners 2. Mounted in the cross bar forwardly of the platform is a bolt 4 which is provided with a split head which extends below the cross bar, and secured to the upper and lower faces of the cross bar through which the bolt 4 projects are plates 4' through which the bolt extends, the plates preventing splitting of the cross bar when strain is applied upon the bolt. The head of the bolt 4 engages against the plate 4' secured to the under face of the cross bar and pivotally mounted between the arms of the split head is the forward end of a steering blade or runner 5 which extends longitudinally of the sled and which is tapered from its rear end to its forward end. The upper or threaded end of the bolt 4 projects above the cross bar 3, and loosely mounted on the upper projecting end of the bolt is a steering bar 6 which rests against the plate 4' which is secured on the upper face of the cross bar, the steering bar being of a length sufficient so that the ends thereof project outwardly of the runners 2. Threadably mounted on the upper extremity of the bolt 4 is a nut 5' which engages against the upper face of the steering bar to prevent accidental disengagement of the same from the bolt and to prevent disengagement of the bolt from the cross bar.

Disposed through the platform and through one of the cross bars 3 rearwardly of the forward cross bar at its ends are bolts 8, the threaded ends of which project below the cross bars, and mounted on the threaded end of the bolts are a pair of spaced transversely extending arcuate bars 9, the bars being supported on the bolts by the nuts 10 which are threaded on the lower extremities of the bolts. The rear end of the steering runner 5 extends closely adjacent to the forward edges of the bars 9, and projecting inwardly from the inner faces of the runners 2 forward of the bars 9 are brackets 11 in which rollers 12 are mounted. A plate 13 is connected to the rear end of the steering runner, the plate projecting rearwardly of the runner and on opposite sides thereof, the rear edge of the plate being disposed between the bars 9. Connected to the side edges of the plate 13 on opposite sides of the runner 5 are the extremities of cables 14 which are engaged around the rollers 12, and extend forwardly through guide eyes 15 secured to the inner faces of the runners 2, the forward ends of the cables being secured to the steering bar 6 adjacent its ends.

Mounted on the bolts 8 between the cross bar and the upper face of the upper bar 9 are coiled expansion springs 16 which normally force the bars 9 downwardly against the nuts 10, so that the lower edge of the steering runner 5 is disposed below the lower edges of the rigid runners 2. Secured to the under face of the platform forwardly of the bars 9 is a shield 17 which is adapted to prevent snow or ice from packing between the plates 9 and preventing their adjustment on the steering runner. A longitudinal groove 5' is preferably formed in the lower edge of the steering runner 5, so that a pair of gripping edges will be presented to the ice or snow with which the steering runner engages.

In the practical use of my improved sled, the person disposed upon the platform of the sled grasps the projecting ends of the steering bar with his hands, or places his feet thereagainst, dependent upon his posture on the platform, and as the sled coasts over the surface of the ground, it will be readily seen that the same may be steered in any desired direction by turning the steering bar to move the steering runner at an angle with relation to the direction of travel of the sled, through the medium of the operating cords 14, whereby the sled is turned in the desired direction as it coasts over the ground. When the steering bar is disposed at right angles to the direction of travel of the sled, the steering runner is held in a position parallel with the runners 2, so that the sled will maintain a straight course, but upon movement of the steering bar 6 to move the runner 5 out of its parallel relation with the runners 2, the sled is turned from a straight path in any direction dependent upon the movement of the steering bar. By the provision of the springs 16, the lower edge of the runner 5 at its rear end is normally maintained below the plane of the runners 2, so that upon movement of the runner 5 to one side, the same engages a relatively large surface of snow to insure positive steering of the sled.

Having thus fully described my invention, what I desire to claim and secure by Letters Patent is:—

1. The combination with a sled including a body having spaced parallel rigid runners extending to the forward end of the sled and connected at intervals by cross bars, of a steering runner swivelly connected at its forward end to one of said cross bars, manually operated means carried by the sled and operatively connected to the rear end of the steering runner for moving the same at an angle with relation to the rigid runners and means yieldingly urging the steering member downward.

2. The combination with a sled including a body and spaced parallel rigid runners connected at intervals by cross bars, of a pin loosely connected to and depending from one of the cross bars, a steering runner connected at its forward end to the lower end of the pin, a steering bar mounted on said pin between said cross bar and said steering runner, said steering runner extending longitudinally of the sled between said rigid runners, spaced transversely extending bars connected to another of said cross bars rearwardly of the steering runner, a laterally projecting plate carried by the rear end of said steering runner and disposed between said bars, and means operatively connected to the opposite ends of said steering bar and to said plate whereby upon movement of the steering bar the steering runner is moved to extend at any desired angle with relation to said rigid runners.

3. In combination with a sled including a body and spaced parallel rigid runners connected at intervals by cross-bars, of a pin loosely connected to and depending from one of the cross bars, a steering runner connected at its forward end to the lower end of the pin, a steering bar mounted on said pin between said cross bar and said steering runner, said steering runner extending longitudinally of the sled between said rigid runners, spaced transversely extending bars connected to another of said cross bars rearwardly of the steering runner, a laterally projecting plate carried by the rear end of said steering runner and disposed between said bars, brackets extending inwardly from said rigid runners adjacent the rear end of said steering runner, rollers carried by said brackets, and operating cords connected at their forward ends to the opposite ends of said steering bar, said cords extending around said rollers and being connected to the outer ends of said plate.

4. In combination with a sled including a body and spaced parallel rigid runners connected at intervals by cross bars, of a pin loosely connected to and depending from one of the cross bars, a steering runner connected at its forward end to the lower end of the pin, a steering bar mounted on said pin between said cross bar and said steering runner, said steering runner extending longitudinally of the sled between said rigid runners, bolts depending from the opposite ends of one of said cross bars rearwardly of the steering runner, spaced transversely extending bars loosely mounted on said bolts, a laterally projecting plate carried by the rear end of said steering runner and disposed between said bars, springs mounted on said bolts to normally force said plates downwardly to dispose the lower edge of said steering runner below the lower edges of said rigid runners, and means operatively connected to the opposite ends of the steering bar and to said plate whereby upon movement of the steering bar the steering runner is moved to extend at any desired angle with relation to said rigid runners.

5. A dirigible sled including spaced runners, a steering runner pivotally mounted at its forward end for movement in a horizontal and in a vertical plane, manually operable means for swinging the steering runner in a horizontal plane, and resilient means engaging the rear end of the steering runner and urging it downward.

6. A dirigible sled including spaced runners, a steering runner disposed between the first named runners and pivotally mounted at the forward end of the sled for movement in a horizontal and in a vertical plane, transversely extending guides disposed rearward of the steering runner, a member mounted upon the steering runner and engaged between said guides, manually operable means for shifting the rear end of the runner in a horizontal plane, and means resiliently urging said guides downward to thereby force the rear end of the steering runner downward.

7. A dirigible sled including spaced main runners extending to the forward end of the sled, a steering runner disposed between the main runners, the forward end of the steering runner being swiveled to permit movement of the rear portion of the steering runner in a horizontal or in a vertical plane, the forward end of the steering runner being upwardly inclined, the forward end of the steering runner at its pivotal mounting being level with the main runners, and means urging the rear end of the steering runner downward below the level of the main runners.

In testimony whereof I hereunto affix my signature in the presence of two witnesses.

RICHARD H. HAMEL.

Witnesses:
ALICE DESJARDINS,
L. PHILIPPE DESJARDINS.

Copies of this patent may be obtained for five cents each, by addressing the "Commissioner of Patents, Washington, D. C."